Aug. 21, 1951 | O. J. ALLEN | 2,564,660

MEANS FOR INTERCONNECTING RADIO AND TELEPHONE SYSTEMS

Filed Aug. 2, 1946 | 4 Sheets-Sheet 1

INVENTOR
OLLIE J. ALLEN
BY William D. Hall
ATTORNEY

Aug. 21, 1951

O. J. ALLEN

MEANS FOR INTERCONNECTING RADIO AND TELEPHONE SYSTEMS 2,564,660

Filed Aug. 2, 1946

4 Sheets-Sheet 2

INVENTOR
OLLIE J. ALLEN
BY William D. Hall.
ATTORNEY

Aug. 21, 1951

O. J. ALLEN
MEANS FOR INTERCONNECTING RADIO
AND TELEPHONE SYSTEMS 2,564,660

Filed Aug. 2, 1946

4 Sheets-Sheet 3

INVENTOR
OLLIE J. ALLEN
BY William D. Hall
ATTORNEY

INVENTOR
OLLIE J. ALLEN
BY William D. Hall.
ATTORNEY

UNITED STATES PATENT OFFICE 2,564,660

MEANS FOR INTERCONNECTING RADIO AND TELEPHONE SYSTEMS

Ollie J. Allen, United States Army, Fort Benning, Ga.

Application August 2, 1946, Serial No. 687,858

16 Claims. (Cl. 179—2.5)

(Granted under the act of March 3, 1883, as amended April 30, 1928; 370 O. G. 757)

The invention described herein may be manufactured and used by or for the Government for governmental purposes, without the payment of any royalty thereon.

This invention relates to communication systems and more particularly to devices for the remote control of voice communication systems and apparatus.

It is one object of my invention to provide means that will control and actuate communication apparatus by voice currents.

It is another object of my invention to provide means for automatically switching one communication circuit into another communication circuit upon the reception of a voice-frequency alternating circuit.

It is a further object of my invention to provide a device for use with standard voice communication apparatus that provides an automatic ringing voltage actuated by voice-frequency alternating currents.

Another object of my invention is to provide a device for utilization with standard voice communication apparatus that gives an automatic ringing voltage actuated by voice frequency currents and prevents the ringer from again functioning until a predetermined lapse of time has occurred.

Another object of my invention is the provision of a device that will switch one circuit into another circuit upon the reception of a voice-frequency alternating current and is equipped with a monitoring means.

Still another object of my invention is to provide a device that will automatically turn on a radio transmitter by means of voice currents and utilize the same voice currents to modulate the radio transmitter.

Another object of my invention is to provide means that may be utilized to automatically connect various types of voice communication apparatus to commercial telephone lines.

The above and other objects and advantages will become readily apparent from the specification when read in conjunction with the drawings in which.

My communication system permits communication directly between a remotely situated radio transmitter-receiver and a commercial telephone system of the dial type, without an operator being necessary at the telephone line. This is accomplished by providing a second radio transmitter-receiver at the telephone line, the output of which is connected to the dial telephone line through a remote control unit. In order to operate the dial mechanism of the commercial telephone line there is provided a "dial" unit at the remotely positioned radio transmitter-receiver to enable that apparatus to transmit a series of audio frequency pulses to the radio transmitter-receiver connected to the commercial telephone line through the remote control unit. In order to transform the received audio frequency impulses to impulses of a character to operate the dial mechanism I provide a "respondor" unit that is connected to the output of the second radio transmitter-receiver and also across the dial telephone line. The details of the remote control unit, the "dial" unit, and the "respondor" will be given later in this specification.

Figure 1:
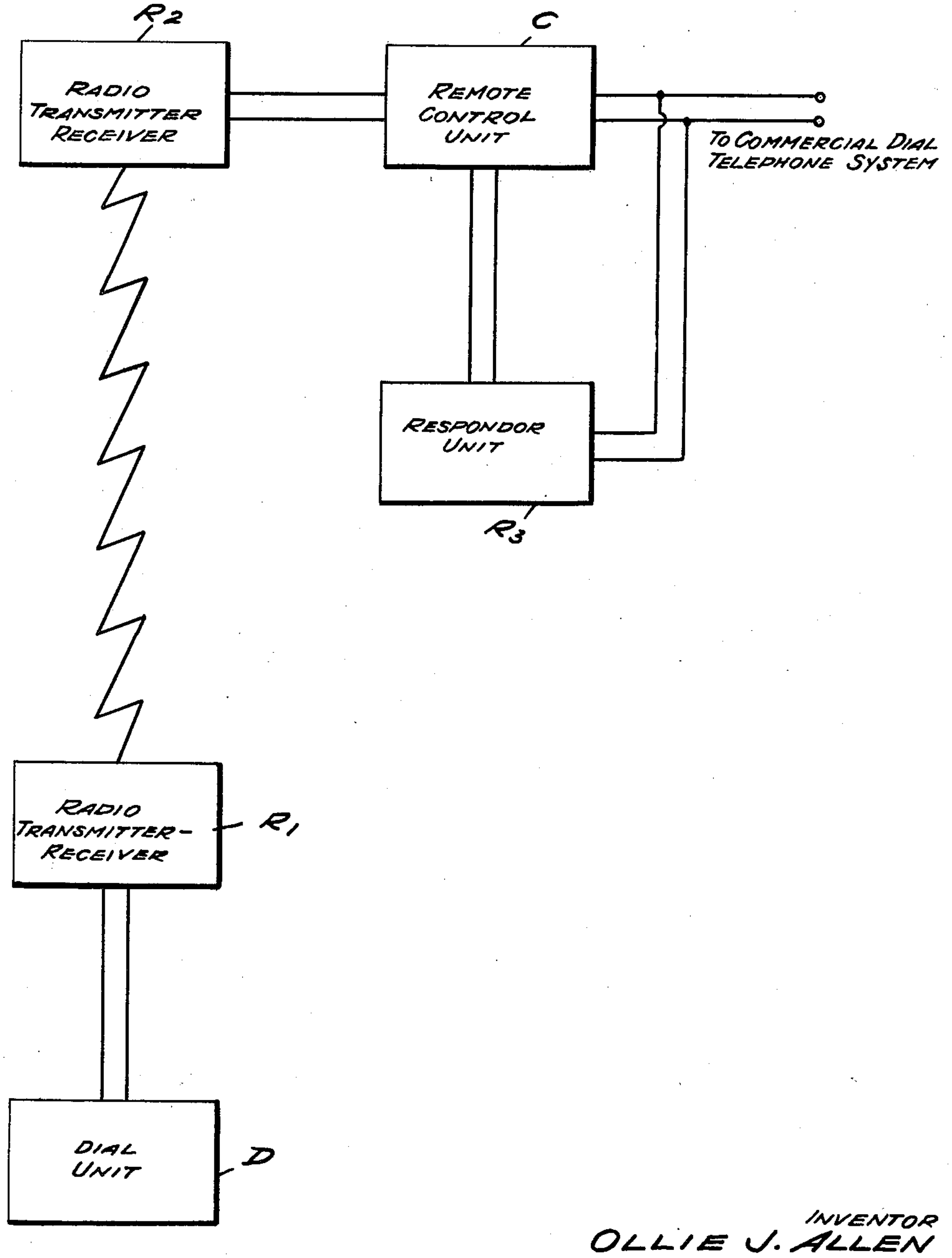
Fig. 1 is a block diagram of one embodiment of my communication system.

Reference is made to Fig. 1 which illustrates in block diagram form how my invention may be utilized to connect a radio network with a commercial telephone line utilizing the dial system. When it is desired to connect a radio network with a commercial telephone line utilizing the dial system it is necessary that some means be provided to transmit electrical impulses from the remote radio transmitter which will be received by the radio receiver connected to the commercial telephone line through the remote control unit so as to reproduce and transform the transmitted impulses to impulses of a character to actuate the dial mechanism of the commercial line. In order to accomplish this I have provided a "dial" unit D, which may be selectively connected to a remotely situated radio transmitter-receiver set $R_1$ so that a series of audio frequency impulses may be transmitted by radio $R_1$ to be received by a radio transmitter-receiver set $R_2$, the output of which is fed into a remote control unit C of the type illustrated in Fig. 3. The output of the control unit C is connected to the commercial dial telephone line. Across the commercial telephone line and connected to the remote control unit C is placed a "respondor" unit $R_3$ which changes the received audio frequency impulses to the type of electrical impulses that will actuate the commercial dial system.

If it is desired to make a call from the radio $R_1$ to a dial telephone on the commercial line, the radio operator of the radio transmitting and receiving set $R_1$ connects the "dial" unit D into the microphone circuit of the transmitter $R_1$. The desired number is then dialed directly on the "dial" unit D, which causes the transmitter of $R_1$ to send out a series of audio frequency impulses which are received by the receiver portion of the radio transmitter-receiver $R_2$, the output of which is sent through the remote control unit C into the "respondor" $R_3$. The "respondor" $R_3$ transforms these received audio frequency impulses into impulses of the type which will actuate the dial system of the commercial line and will ring the desired number.

If it is desired to establish voice communication with the radio $R_1$ from a dial telephone on the commercial line, the user merely dials the number of the line to which the remote control unit C is connected. The remote control unit C then automatically places the transmitter portion of $R_2$ into operation, in a manner to be described later, and voice communication may then be had directly between the dial phone and the radio set $R_1$. In this operation neither the "respondor" unit $R_3$ nor the "dial" unit D are utilized.

My remote control device C will perform many functions automatically; for control and actuation it utilizes the one thing that is common to all voice communication systems—voice currents. The device when connected between a voice radio and a telephone circuit will automatically turn the transmitter on and transmit the voice impulses over the air. In addition, the device will automatically ring the telephone circuit on the first incoming radio signal or call.

My remote control device will also operate as a radio relay when connected to two like radio sets on different frequency channels and will automatically relay the voice signals received on the first radio to the transmitter of the second radio and at the same time will turn the second transmitter on. A time delay is incorporated in the device so that a predetermined period after the voice signals are terminated the device is ready for the voice signals from the other direction.

When my remote control device is connected to two dissimilar radio sets, performance as described in the previous paragraph will result. The type of radio set, its power output, frequency, or type of modulation makes no difference in the operation of my device.

The remote control device to be described when connected between a telephone circuit and a radio, will bridge a gap in a wire circuit by relaying the voice currents to another radio, automatic ringing being provided in both directions.

When connected in a wire line between two telephones or switchboards, my remote control device will function as a repeater and amplifier.

My remote control device basically comprises two complete audio amplifiers with their associate relays, ringing and switching circuits. The actual circuit component values will, of course, depend upon the tube types used, the power supply voltages, and the audio gain desired. The unit is designed primarily as a light weight portable field unit but may of course be constructed in larger size for fixed plant operation.

Figure 2:
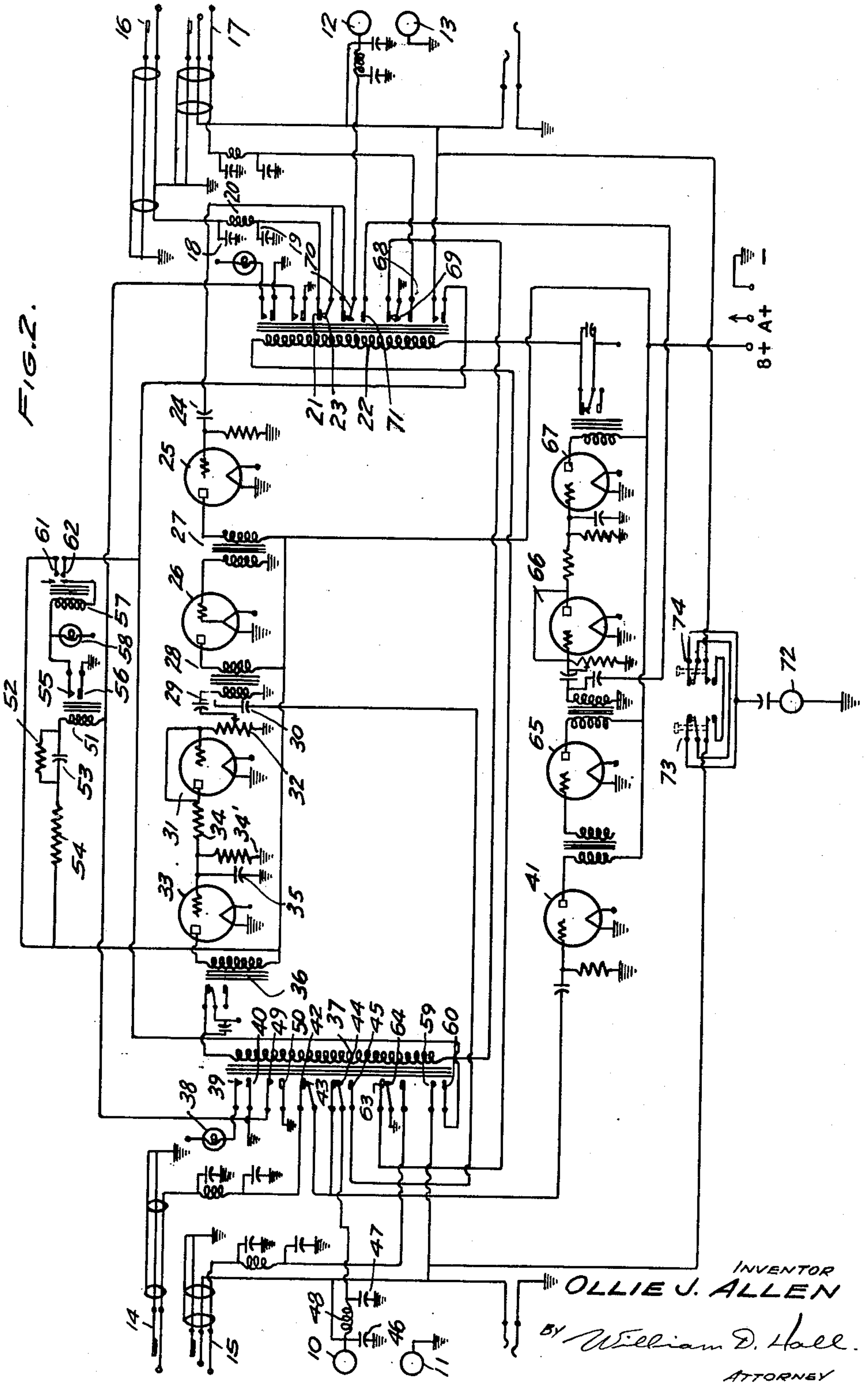
Fig. 2 is a schematic diagram of one embodiment of a remote control unit utilized in my communication system.

Referring to Fig. 2, it is seen that reference numerals 10, 11, 12 and 13 refer to terminals by which the device may be connected to the apparatus which it is desired to control. A plurality of plugs 14, 15, 16 and 17 are also provided to connect the device to the particular voice communication apparatus it is desired to control. To clearly describe the function of the device it will be assumed that a telephone line is connected to the terminals 10 and 11 and is terminated in a battery-powered type of field telephone having a magneto type of bell-ringing circuit. It will also be assumed that the plugs 16 and 17 are plugged into the headphone and microphone jacks of a portable radio transceiver. The telephone utilized may be of the type that is widely known and used by the Signal Corps and has the Signal Corps nomenclature EE-8. The portable transceiver utilized may be the well-known "Walkie-Talkie" having the official Signal Corps nomenclature "SCR-300."

If it is assumed that the first call is an incoming call from the radio, the voice signals coming from the radio enter the device through the tip of plug 16 and pass through a pair of radio frequency by-pass condensers 18 and 19 and a radio frequency choke 20 to a contact 21 of a relay 22. From this contact the circuit is continued through relay contact 23 to a condenser 24 onto the control grid of a vacuum tube 25. The signal is then amplified by the two-stage high gain amplifier represented by vacuum tubes 25, 26, and transformers 27 and 28.

After being amplified, the voice signal is divided, part going through a condenser 29 and part going through a condenser 30. The electrical path through the condenser 29 will be described first since it must function before the other path can be utilized. After passing through the condenser 29, the voice signal is applied to a vacuum tube 31 which may be a diode rectifier or a triode having the grid and plate tied together, through a relay adjust potentiometer 32. The positive half of the voice signal currents cause the tube 31 to become conducting. Current flow to ground is restricted by means of the high resistance of the potentiometer 32 thus causing a high negative voltage on the plate and grid of the vacuum tube 31. This negative voltage is impressed upon the control grid of a vacuum tube 33 through an audio blocking resistor 34. A condenser 35 is used as an audio by-pass to ground and to prevent the operation of the relay circuit on short duration noise peaks.

The operation of the vacuum tube 33 is such that when no voltage is applied to its control grid the plate draws sufficient current to energize a relay 36. The instant that the negative voltage is applied to its control grid the plate of the tube 33 ceases to draw current and the relay 36 is released allowing the back contacts to close. The contacts on the relay 36 complete a circuit from the "A" voltage supply through a relay 37, through contacts on relay 22 to ground. This causes the actuation of the relay 37 which performs the following functions:

A pilot light 38 is operated by the closing of contacts 39 and 40 of the relay 37.

The terminal 10 which is normally connected to the control grid of a vacuum tube 41 through relay contacts 43 and 44 is disconnected therefrom and the condenser 30 is connected to the terminal 10 through relay contacts 44 and 45.

This permits the voice signals to travel from the condenser 30, through the contacts 44 and 45, through the radio frequency filter network comprising two condensers 46 and 47 and an inductance 48 and through the telephone that is connected to the terminals 10 and 11.

Closing of the relay 37 connects one side of a relay 51 to ground through a pair of contacts 49 and 50 of the relay 37. The other side of the relay 51 is connected to the B+ supply through a resistor 52, condenser 53, and a resistor 54. This circuit provides automatic ringing in the following manner. Condenser 53 is of sufficiently large capacity that during the first part of its charge period it permits sufficient current to flow to close the relay 51. The resistor 54 is inserted in series with the relay 51 to prolong this optimum current flow by limiting the current that is permitted to enter the condenser 53. During the period that the relay 51 is energized, its contacts 55 and 56 complete a circuit from the "A" voltage supply through a 20 cycle vibrator 57 and a pilot light 58. As the condenser 53 receives a given charge the rate of current flow is insufficient to keep the relay 51 energized, with the result that its contacts 55 and 56 open, thus removing the voltage from the vibrator 57 and the pilot light 58. The resistor 52 is placed across the condenser 53 in order to bleed the stored current so that after the applied voltage is removed from the condenser 53 it will be ready to receive another charge after a lapse of a time greater than a predetermined amount, say 15 seconds. As long as there is no pause in conversation from either direction greater than the predetermined time delay the relay 51 will not be energized.

Energization of the relay 37 also closes a pair of contacts 59 and 60 which connects the high voltage from the vibrator 57 through vibrator contacts 61 and 62 to the terminal 10. This applies the 20 cycle ringing current over the telephone line as long as the relay 51 is energized.

Energization of the relay 37 further causes a pair of relay contacts 63 and 64 to open, thus disconnecting the winding of the relay 22 from ground. This effectively prevents the relay 22 from operating should stray voltages be impressed upon the amplifier tube 41.

When the voice impulses cease to come from the radio receiver, the resistors 34 and 34′ begin to bleed the negative voltage in vacuum tubes 31 and 33 to ground. The optimum time to reduce this voltage to zero so that the relay 36 is again energized, is one second. This allows for any slight pauses in the incoming speech signals so that the relay circuits will remain closed. When the contacts on the relay 36 open, the relay 37 is released, and all contacts are restored to their original position.

After the relay 37 has cleared, the voice signals from the telephone are then permitted to enter the connector 10, through the radio frequency filter network 46, 47 and 48 to be impressed upon the control grid of the amplifier tube 41. This circuit, including the vacuum tubes 41, 65, 66 and 67 performs in the same manner as the circuit just described, which includes the vacuum tubes 25, 26, 31 and 33 except for the functioning of the relay 22 which performs the following additional functions.

Energization of the relay 22 closes a pair of contacts 68 and 69 which connect the tip of the plug 17 to ground which places the radio set in the transmitting position. The ring of the plug 17 is connected to the output of the amplifier tube 65 through contacts 70 and 71, which causes the incoming voice signals from the telephone to modulate the radio transmitter.

Energization of the relay 22 also connects the vibrator 57 to the connector 12 for ringing if the call from the telephone has been delayed over a predetermined length of time, say 15 seconds. If the call was forthcoming before the elapse of 15 seconds the relay 51 will not be energized, and no ringing will take place.

For the purpose of monitoring, a dynamic type of loudspeaker 72 is provided. The loudspeaker 72 may also be utilized as a microphone and is connected into either circuit by means of push button switches 73 and 74. If both switches 73 and 74 are depressed simultaneously the speaker 72 will be removed from both circuits.

Figure 3:
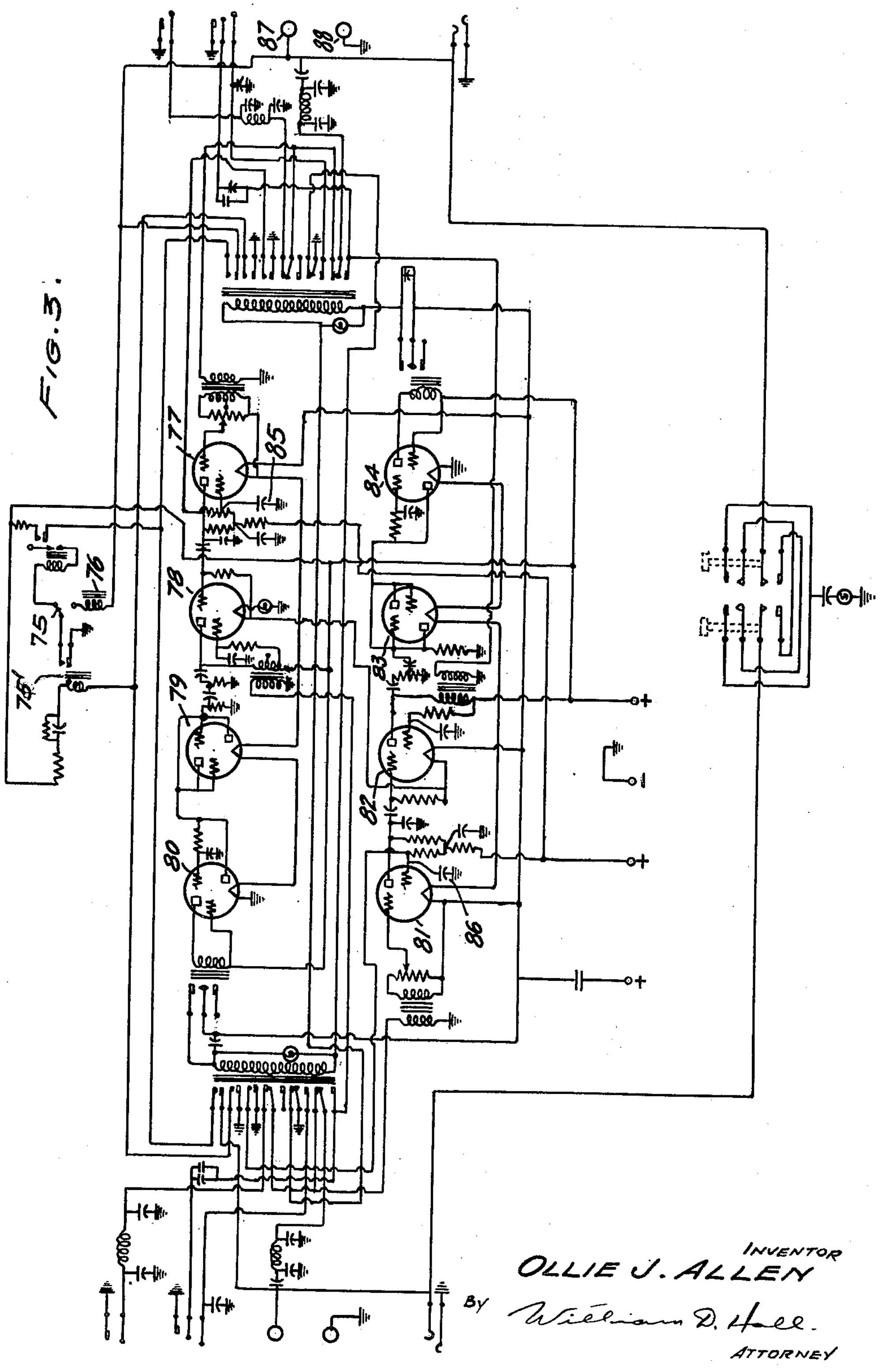
Fig. 3 is a schematic diagram of another embodiment of a remote control unit utilized in my communication system.

Fig. 3 illustrates a modification of my remote control unit in which the circuit of Fig. 2 has been changed to include a single pole double throw switch 75 and a holding coil 76. Also, the vacuum tubes 25, 26, 31, 33, 41, 65, 66 and 67 of the triode type have been replaced by tetrodes 77, 78, 79, 80, 81, 82, 83 and 84 respectively. The screen grid of tetrodes 77 and 81 are each provided with an 8 mfd. condenser 85 and 86 respectively, and connections through the relay to ground from the screen grid. The purpose of this is to provide a delay between the operation of the two amplifiers to prevent automatic cycling due to "kick-back" noises from radio receivers. This also effectively disables the unused amplifier to prevent any possibility of audio feedback.

The addition of the switch 75 and holding coil 76 is utilized when my device is to be connected into a commercial telephone line. With the switch 75 in the position illustrated, the device will automatically ring telephones. With the switch 75 in the holding-coil position and a commercial telephone line connected to the right side of the circuit to connectors 87 and 88, the first incoming ringing voltage activates a ringing relay 75′ which throws the holding coil 76 across the line for approximately one second. This action clears the ringing relay at the commercial telephone exchange and allows normal conversation to be carried on from the commercial line to any apparatus connected on the other side of the device. When the party on the commercial line hangs up the phone the commercial switchboard automatically clears and the control device is ready to receive another call after the delay time for the ringing relay has elapsed.

Figure 4:
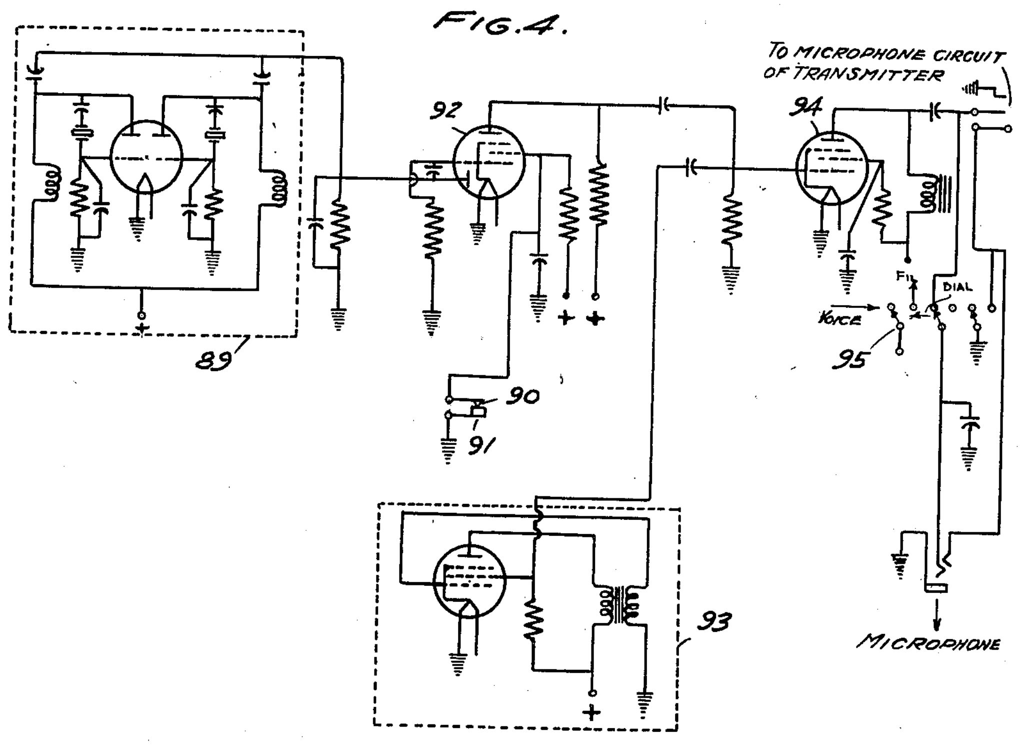
Fig. 4 is a circuit diagram of a dial unit which may be utilized with the communication system of Fig. 1.

Fig. 4 illustrates in circuit diagram form the "dial" unit D which is used with my control device in the manner disclosed above. As seen from Fig. 4, the reference numeral 89 refers to a dual oscillator of the well known Pierce type which produces a 3000 cycle signal by beating the radio frequency output of each crystal. This produces a very stable audio frequency voltage. The entry of this signal into the radio $R_1$ connected to the dial device is controlled by dial contacts 90 and 91 which act to ground the screen grid of a first audio amplifier tube 92. Grounding the screen grid blocks the tube 92 causing it to operate as an electronic switch. A 100 cycle tone is generated by a transformer-coupled audio oscillator 93. Both the 3000 cycle signal and the 100 cycle signal are fed into a common audio amplifier tube 94 which is connected into the microphone circuit of the radio being used. A switch 95 is utilized to switch from dial to voice.

The 100 cycle voltage signal is utilized to operate the control unit C to hold it in the radio to telephone position. This holds the control unit open from radio to telephone until the dialing operation is finished. The 3000 cycle tone pulses are superimposed upon the continuous 100 cycle tone for actuating a dialing relay in the respondor unit of Fig. 5.

Figure 5:
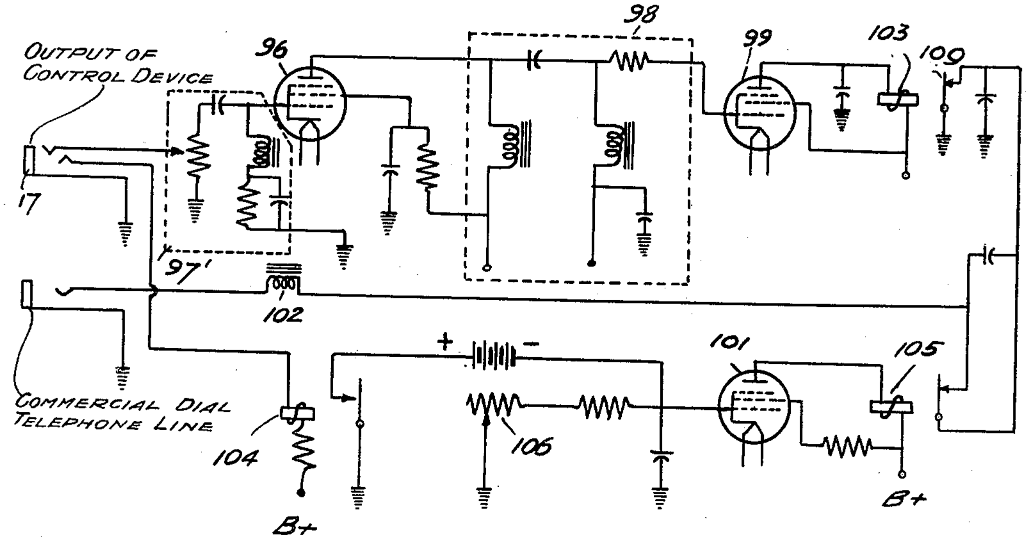
Fig. 5 is a circuit diagram of a respondor unit that may be utilized with the communication system of Fig. 1.

Fig. 5 illustrates in circuit diagram form the "respondor" unit $R_3$ for use in conjunction with the "dial" unit D as described above. The "respondor" unit $R_3$ comprises an audio amplifier tube 96 with band pass filters 97, 98 on its input and output side respectively. Filters 97 and 98 are designed to pass signals of 3000 cycles only. The amplifier tube 96 feeds its output into a relay tube 99 that opens a relay contact 100 of a dial relay 103 upon the reception of a 3000 cycle signal. A holding coil relay tube 101 is utilized to operate a relay 105 to place a holding coil 102 across the dial telephone line for a predetermined amount of time.

The operation of the "dial" unit C described in Fig. 4 and the "respondor" $R_3$ just described is as follows: The dial unit switch 95 is placed in the "dial" position. The closing of switch 95 turns on the two oscillators 89 and 93 as well as the radio transmitter while disconnecting the microphone and modulating the radio with a continuous 100 cycle per second tone. The 100 cycle per second tone is received by the radio $R_2$ connected to the telephone line end of the circuit. This 100 cycle tone energizes the remote control unit C which connects the tip of the plug (upper left hand of Fig. 5) to ground. This causes a relay 104 to close, applying a high negative bias to the relay tube 101. The tube 101 stops drawing current and its relay 105 drops open which places a holding coil 102 across the telephone line. A dial tone from the commercial system is then placed on the line but does not operate the remote control unit C since it is locked in the radio to telephone position by the 100 cycle per second signal.

Upon dialing a number with the dial unit of Fig. 4, a 3000 cycle per second tone in addition to the 100 cycle per second tone just described is used to modulate the remote transmitter $R_1$ to which the dial unit is attached. The 3000 cycle per second tone is keyed by the telephone dial of the dial unit. This tone is received by the radio $R_2$ connected to the telephone line end of the circuit, passes through the control device C and into the "respondor" $R_3$, and is applied to the band pass filters, amplifier and relay circuits which disconnects the holding coil 102 from the line in exact sequence with the numbers dialed on the dial unit D.

Upon placing the switch 95 to "voice" position the radio $R_1$ is disconnected from the dial unit and the radio receiver is turned on. The remote control unit C on the commercial telephone line no longer receiving an audio signal, clears. The relay 104 applying bias to the holding coil tube 101 is released but the holding coil tube 101 keeps the holding coil 102 across the line a predetermined amount of time, depending upon the setting of a potentiometer 106 in the grid circuit of tube 101 which draws off the voltage stored in the grid bias condenser. This allows the telephone circuit to clear after the conversation from the radio to telephone has ceased for a given length of time. It also allows the telephone line to clear if a busy signal is received or no one answers the telephone called.

While I have illustrated and described one form of my invention, I do not wish to limit myself to the precise details of the circuits shown, but desire to avail myself of such variations and modifications as may come within the scope and spirit of the claims appended hereto.

I claim:

1. In a device of the class described, means for receiving the output of a communication circuit, an audio amplifier, a normally conducting vacuum tube in the output circuit of said audio amplifier, means for blocking said normally conducting vacuum tube upon the reception of a voice-frequency signal from the communication circuit, a relay said relay having a pair of normally-open contacts, means in series with said normally-open contacts for energizing said relay upon the blocking of said normally conducting vacuum tube, an output connecting means for the device, a source of low audio frequency voltage, and means for connecting said low frequency voltage source to said output connections upon the energization of said relay.

2. In a system for two way communication, a control device comprising a first and second pair of terminals, a pair of one-way paths, one of said paths for voice signals going in one direction and the other of said paths for voice signals going in the opposite direction, switching means responsive to all voice signal inputs applied to said terminals for connecting one of said paths between said terminals while disconnecting the other of said paths, said last-named means being coupled to said one path, a source of low audio frequency signals, means in circuit with said switching means for connecting said source to the path connected between said terminals, said source of low audio frequency signals including means for disconnecting said source after a predetermined time interval.

3. In a system comprising two communication systems, a control device for connecting one of said systems to the other of said systems upon the reception of any voice frequency signal in one of said systems comprising an audio frequency amplifier for each communication system for amplifying said voice frequency signal, a relay, said relay having an operating coil and normally open contacts, means responsive to any voice frequency signals for connecting an audio amplifier to one of said systems, these means including the contact of the relay, rectifier means connecting said coil to said amplifier, said rectifier means, upon the reception of said voice frequency signal, causing the relay to operate and to close the normally open contacts, and means for holding said relay operated a predetermined period of time after the cessation of the voice frequency signal.

4. In a system comprising a first voice communications system, a second voice communication system, and a control device for automatically connecting said first voice communication system to said second communication system upon the passage through one of said systems of a voice frequency signal, comprising, an audio amplifier for each of said communication systems, a relay for each of said amplifiers for connecting the output of one of said audio amplifiers to one of said voice communication systems, a source of low audio frequency voltage, means in circuit with said relay for connecting said low frequency voltage source to one of said voice communication systems upon the receipt of any voice frequency signal in the other of said voice communication systems, means for automatically disconnecting said low audio frequency voltage source a predetermined length of time after the reception of the voice frequency signal, and means for retaining the connection between one of said voice communication systems to the output of one of said audio amplifiers through one of said relays a predetermined period of time after the cessation of the voice frequency signal.

5. In a system comprising two electrical communication circuits, a control device for automatically connecting one electrical communication circuit to another electrical communication circuit upon the reception of a voice frequency signal in one of said communication circuits, comprising, an audio amplifier for each of said circuits, a relay for each of said amplifiers for connecting the output of one of said amplifiers to one of said electrical communication circuits upon the reception of a voice frequency signal in the other of said electrical communication circuits, a source of low audio frequency voltage, means resposive to all audio frequency signals for automatically connecting said low audio frequency voltage source to one of said electrical communication circuits upon reception of a voice frequency signal in the other of said electrical communication circuits, said last-named means being in circuit with said relay and means for deenergizing said amplifier relay a predetermined period of time after the cessation of said voice frequency signal.

6. In a system comprising two voice communication systems, a control device for automatically connecting one of said voice communications systems to the other of said voice communications systems upon the passage through one of said systems of a voice frequency signal, comprising, two audio amplifiers, one audio amplifier for each of said communications systems and for amplifying said voice frequency signals, a relay, said relay having an operating coil and normally opened contacts, means in circuit with one of said communication systems for connecting one of said voice communications systems to one of said amplifiers, these means including the contacts of the relay, rectifier means connecting said coil to said amplifier, said rectifier means, upon the reception of any voice frequency signal, causing the relay to operate and to close the normally opened contacts, a source of low frequency voltage, means responsive to the closing of said contacts for connecting said low frequency voltage source to one of said voice communications systems upon the reception of a voice frequency signal in the other of said voice communications systems, means for disconnecting said low frequency voltage source including means for disconnecting said source a predetermined time after the reception of the voice frequency signal, and means for providing a delay between the operation of said two audio amplifiers, said means including a resistor condensor network.

7. In a communication system comprising a source of high audio frequency signal, a source of low audio frequency signal, and a transmission line, a responder unit comprising an input portion including an audio amplifier for said high audio frequency signals and a band pass filter for passing said high audio frequency signals, a first relay tube actuated by the high audio frequency output of said amplifier, a first relay connected in circuit with said first relay tube, said first relay having normally open contacts, a second relay tube actuated by said low frequency audio signal, a second relay in circuit with said second relay tube, said last-named relay having normally open contacts, a holding coil having one side in circuit with the relay contacts of both relays and having its other side connected across said transmission line, whereby upon receipt of signals, the relays operate to place the coil across said transmission line.

8. In a communication system comprising a source of high audio frequency signal, a source of low audio frequency signal, and a communication line, a responder unit comprising an input portion including an audio amplifier for said high audio frequency signals and a band pass filter for passing said high audio frequency signals, a first relay tube actuated by the output of said amplifier, a first relay connected in circuit with said first relay tube, said relay having normally open contacts, a second relay tube actuated by said low frequency audio signal, a delay means including a condenser in the input circuit of said second relay tube, a second relay in circuit with said second relay tube, said last-named relay having normally open contacts, a holding coil having one side in circuit with the relay contacts of both relays and having its other side connected across said telephone line, whereby upon receipt of signals, the relays operate to place the coil across said communication line, and upon the cessation of said signals the delay means retains said holding coil across the communication line for a predetermined period of time.

9. In a device of the class described, means for receiving the output of a communication of circuit, an audio frequency amplifier, a normally conducting vacuum tube in the output circuit of said audio amplifier, means for blocking said normally conducting vacuum tube upon the reception of any voice frequency signal from the communication circuit, a relay, said relay having a pair of normally open contacts, means in series with the output of said tube for actuating said relay upon the blocking of said normally conducting vacuum tube, a source of low audio frequency voltage having means in series with said normally open contacts for energizing said source, and output connecting means for connecting said source across said means for receiving whereby upon the reception of any voice frequency signal said relay operates closing said contacts, energizing said low audio frequency source thereby causing a low audio frequency to be impressed across said means for receiving.

10. A device according to claim 9 wherein said means in series with said normally open contacts includes means for disconnecting said low audio frequency source a predetermined length of time after the reception of a voice frequency signal.

11. In a device of the class described, means for receiving the output of a communication circuit, an audio amplifier for amplifying any voice frequency signal, a normally conducting vacuum tube, means coupling a portion of the output of said audio frequency amplifier to said normally conducting vacuum tube, whereby upon the receipt of any voice frequency signals said normally conducting vacuum tube is blocked, a relay having an operating coil in the output of said vacuum tube and having normally open contacts which close upon blocking of said tube, a source of low audio frequency signals, circuit means in series with said normally open contacts for connecting said source across the output of said communications circuit, said source including a delay means, whereby upon the receipt of voice frequency signals said relay contacts close causing said source to be connected across the output of said communication circuit and disconnecting said source a predetermined time after the initial reception of said voice frequency signals.

12. In a system comprising two voice communication systems, a control device for automatically connecting one of said voice communication systems to the other of said voice communication systems upon the reception in one of said systems of a voice frequency signal, comprising: an audio frequency amplifier for each of said systems, a first relay having an operating coil and a pair of normally-open contacts; a normally conducting vacuum tube, means connecting said normally-conducting vacuum tube to the output circuit of one of said amplifiers whereby upon the receipt of any audio frequency signal said normally conducting vacuum tube is rendered non-conductive; means connecting the operating coil of said first relay to the output of said normally conducting vacuum tube; a second relay having an operating coil connected in series with said normally open contacts of said first relay, said second relay having a plurality of contacts which upon the operation of said second relay connect said source of low audio frequencies to said other communication system, connect said one amplifier to said other communication system, and disconnect the said other amplifier from said other communication system.

13. A device according to claim 11 wherein said source of low audio frequency signals includes means for disconnecting said source from said other communication system a predetermined time after the reception of said voice frequency signal.

14. In a system for two-way communication a control device comprising a first and second pair of terminals, a one-way path for voice frequency signals going in one direction, and a one-way path for voice frequency signals going in an opposite direction, switching means in each path for connecting one of the paths between said terminals and disconnecting the other part means connecting said switching means to its respective path, said switch means being responsive to all voice frequency signals, a source of substantially constant low frequency signal, said source including input means responsive to all audio frequency signals, whereby upon the receipt of any audio frequency signal said source is connected to said one path; said input means including means for automatically disconnecting said source after the elapse of a predetermined time interval.

15. In a system comprising two communication circuits, a control device for automatically connecting one electrical communication circuit to another communication circuit upon the reception of a voice frequency in one of said communication circuits, comprising: an audio amplifier for each of said circuits; a relay for each of said amplifiers, said relay having an operating coil and normally open contacts; means responsive to all audio frequency signals connecting said relay operating coil to said audio frequency amplifier, whereby upon the receipt of said signals said relay contacts close; a source of substantially constant low audio frequency signals; circuit means in series with said normally open contacts including means for connecting one of said amplifiers to one of said electrical communications circuits and for connecting said source of low audio frequency signals to one of said electrical communication circuits upon the reception of a voice frequency signal in the other of said electrical communication circuits.

16. A system according to claim 15 in which said source of low audio frequency signals includes means for disconnecting said source a predetermined time after the initial reception of said voice frequency signals.

OLLIE J. ALLEN.

REFERENCES CITED

The following references are of record in the file of this patent:

UNITED STATES PATENTS

| Number | Name | Date |
|---|---|---|
| Re. 20,163 | Finch | Nov. 10, 1936 |
| 1,472,821 | Affel | Nov. 6, 1923 |
| 1,688,453 | Demarest | Oct. 23, 1928 |
| 1,941,067 | Armstrong | Dec. 26, 1933 |
| 1,949,136 | Adair | Feb. 27, 1934 |
| 2,061,555 | Bjornson | Nov. 24, 1936 |
| 2,113,217 | Nelson | Apr. 5, 1938 |
| 2,129,332 | Mastini | Sept. 6, 1938 |
| 2,155,807 | Stimson | Apr. 25, 1939 |
| 2,157,234 | Heisner | May 9, 1939 |
| 2,164,185 | Bertnolli | June 27, 1939 |
| 2,211,701 | McGrath | Aug. 13, 1940 |
| 2,254,342 | Zenner | Sept. 2, 1941 |
| 2,265,056 | Bowers | Dec. 2, 1941 |
| 2,271,000 | Lovell | Jan. 27, 1942 |
| 2,322,833 | Dickieson et al. | June 29, 1943 |
| 2,383,908 | Bowers | Aug. 28, 1945 |
| 2,388,001 | Loughren | Oct. 30, 1945 |
| 2,403,726 | Lindenblad | July 9, 1946 |
| 2,419,193 | Bartelink | Apr. 22, 1947 |
| 2,424,216 | Atkins | July 22, 1947 |
| 2,431,167 | Byrnes | Nov. 18, 1947 |
| 2,454,498 | Bartelink | Nov. 23, 1948 |
| 2,457,434 | Bartelink | Dec. 28, 1948 |
| 2,469,555 | Hitchcock | May 10, 1949 |